US009063992B2

(12) United States Patent
Bhide et al.

(10) Patent No.: US 9,063,992 B2
(45) Date of Patent: Jun. 23, 2015

(54) COLUMN BASED DATA TRANSFER IN EXTRACT, TRANSFORM AND LOAD (ETL) SYSTEMS

(71) Applicant: International Business Machines Corporation, Armonk, NY (US)

(72) Inventors: Manish A. Bhide, New Delhi (IN); Krishna K. Bonagiri, Andhra Pradesh (IN); Srinivas K. Mittapalli, Secunderabad (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 13/936,508

(22) Filed: Jul. 8, 2013

(65) Prior Publication Data
US 2013/0297557 A1 Nov. 7, 2013

Related U.S. Application Data

(63) Continuation of application No. 13/238,145, filed on Sep. 21, 2011, now Pat. No. 8,515,898.

(51) Int. Cl.
G06F 17/30 (2006.01)
(52) U.S. Cl.
CPC .............................. *G06F 17/30563* (2013.01)
(58) Field of Classification Search
USPC ..................... 707/2, 3, 602; 706/61; 709/226
See application file for complete search history.

(56) References Cited

U.S. PATENT DOCUMENTS

| 7,747,563 | B2 | 6/2010 | Gehring |
| 7,805,341 | B2 | 9/2010 | Stromquist et al. |
| 8,311,974 | B2 | 11/2012 | Gong |
| 2005/0251533 | A1 | 11/2005 | Harken et al. |
| 2009/0240663 | A1 | 9/2009 | Plattner et al. |
| 2009/0300533 | A1 | 12/2009 | Williamson |
| 2009/0327208 | A1* | 12/2009 | Bittner et al. ................... 706/61 |
| 2012/0054345 | A1* | 3/2012 | Sahu et al. .................... 709/226 |

OTHER PUBLICATIONS

"Implementing a Data Quality Module in an ETL Process"; by: Adarsh Atluri; pp. 1-66—A Project Reported Submitted in Partial Fulfillment of the Requirements for the Degree of Masters of Science in Computer Science; Rochester Institute of Technology; Apr. 2011.

(Continued)

*Primary Examiner* — Etienne Leroux
(74) *Attorney, Agent, or Firm* — Cantor Colburn LLP

(57) ABSTRACT

Executing a plurality of transform stages in an extract, transform and load (ETL) job including, for each of the transform stages, receiving a plurality of input row identifiers (RIDs) corresponding to a first plurality of source database table rows in a source database table. Data is retrieved directly from a subset of the source database table columns in the first plurality of source database table rows based on the input RIDs and transform logic. Partial row data including data from the subset of the source database table columns is generated for each of the first plurality of source database table rows. Transformed data is generated based on the partial row data and to the transform logic. Output RIDs corresponding to a second plurality of rows in the source database table that include a least a subset of the transformed data are output to a downstream stage.

23 Claims, 6 Drawing Sheets

(56) References Cited

OTHER PUBLICATIONS

Cloud Computing: Benefits and Risks of Moving Federal IT into the Cloud, Testimony of Cita M. Furlani, Director, Information Technology Laboratory, National Institute of Standards and Technology, United States Department of Commerce, United States House of Representatives Committee on Oversight and Government Reform, Jul. 1, 2010; pp. 1-11.

Is ETL Becoming Obsolete? Why a Business-Rules-Drive "E-LT" Architecture is Better—pp. 1-9 WP-IsETLObsolete-0206-2.2; Mar. 7, 2006.

The NIST Definition of Cloud Computing (Draft)—Recommendations of the National Institute of Standards and Technology Peter Mell and Timothy Grance; pp. 1-7; Jan. 2011.

\* cited by examiner

COLUMN BASED DATA TRANSFER IN EXTRACT, TRANSFORM AND LOAD (ETL) SYSTEMS

CROSS-REFERENCE TO RELATED APPLICATION

This application is a continuation of U.S. patent application Ser. No. 13/238,145, filed Sep. 21, 2011, the contents of which is incorporated by reference herein in its entirety

BACKGROUND

The present invention relates to computer systems, and more specifically, to column based data transfer in extract, transform and load (ETL) systems.

ETL systems facilitate extracting data from various sources, transforming the extracted data to fit operational requirements, and loading the transformed data into a target database (e.g., a data repository) at a target location. In many cases, the data that is accumulated is in a different format than what is ultimately needed in the data repository. The process of acquiring this data and converting it into useful, compatible, and accurate data is referred to as an ETL process. An example of an application that may be used to perform an ETL process is IBM® Information Server Suite.

In an ETL process, the extract phase acquires data from the source system(s). Data extraction can be as simple as copying a flat file from a database or as sophisticated as setting up interdependencies with remote systems that then supervise the transportation of source data to the target system. The extracted source data is typically stored as one or more relational database tables. The transform phase in the ETL process is typically made up of several stages and includes converting data formats and merging extracted source data to create data in a format suitable for the data repository. In addition, source data obtained in the extract phase from external systems may contain incompatible or incorrect information, depending on the checks and balances that were in effect on the external system, and thus, part of the transform phase includes cleansing and/or rejecting data. Common techniques used as part of the transform phase include character examination (e.g., to reject numeric values that contain characters) and range checking (e.g., to reject values outside of an acceptable range). Rejected records are usually deposited in a separate file and are then processed by a more sophisticated tool or processed manually to correct the problems. The values are then merged into the transformed set of data. The load phase of the ETL process includes depositing the transformed data into the new data store (e.g., the data repository, warehouse, mart, etc.). When the data repository is a relational database, the load process is often accomplished with structure query language (SQL) commands (e.g., IMPORT), utilities (e.g., LOAD), or other SQL tools.

SUMMARY

Embodiments include a method, system, and computer program product for executing a plurality of transform stages in an extract, transform and load (ETL) job. The ETL job includes an extract stage and a load stage in addition to the plurality of transform stages. The ETL job is configured to access a source database table that includes data organized into source database table rows and source database table columns. For each of the transform stages the executing includes receiving, from an upstream stage, a plurality of input row identifiers (RIDs) corresponding to a first plurality of source database table rows in the source database table. The executing for each of the transform stages also includes retrieving data directly from a subset of the source database table columns in the first plurality of source database table rows in the source database table. The retrieving is based on the input RIDs and transform logic associated with the transform stage. Partial row data including data from the subset of the source database table columns is generated for each of the first plurality of source database table rows. Transformed data is generated based on the partial row data and to the transform logic. Output RIDs corresponding to a second plurality of rows in the source database table that include a least a subset of the transformed data are output to a downstream stage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
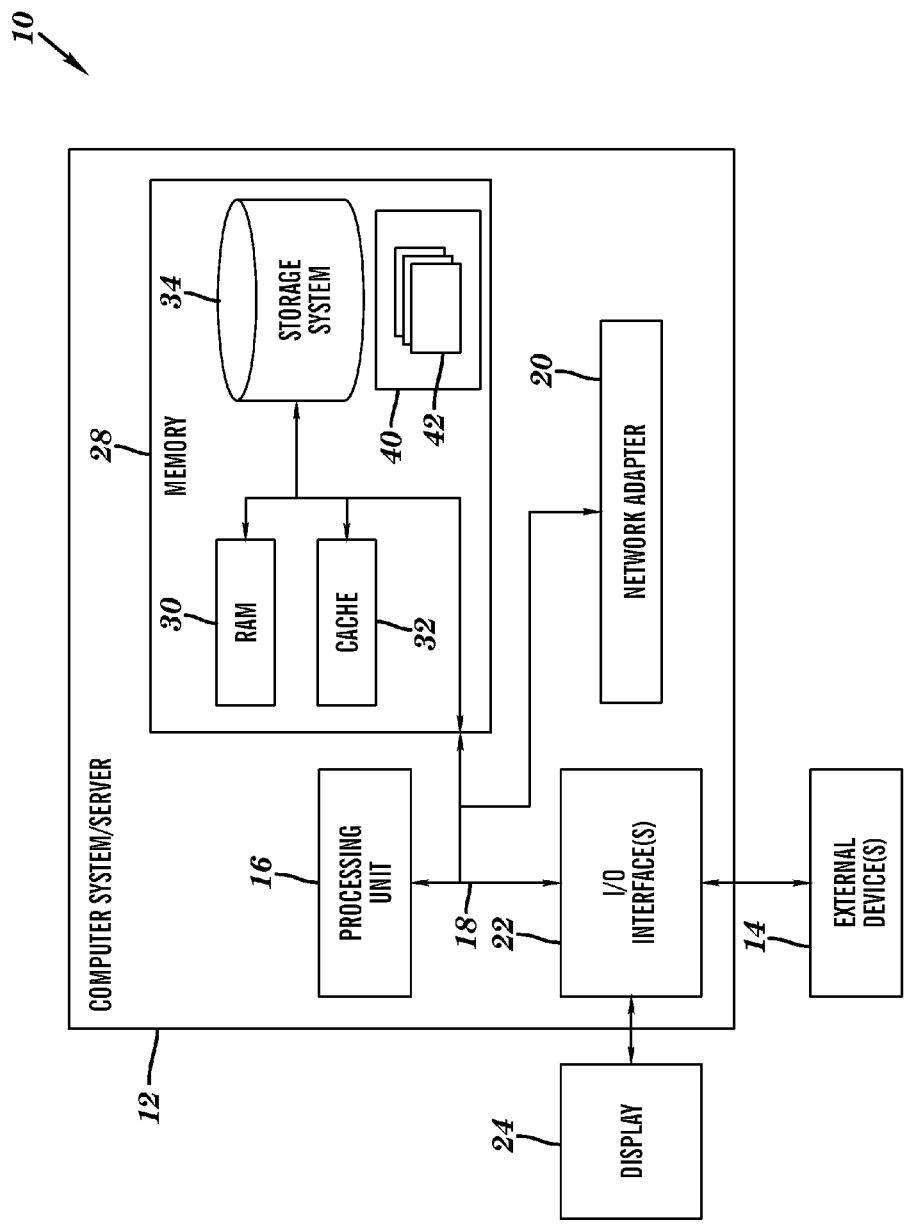
FIG. 1 illustrates a cloud computing node according to an embodiment of the present invention.

Embodiments described herein are directed to extract, transform and load (ETL) systems that use a column based data transfer. The use of column based data transfer in ETL systems limits the amount of data being transferred and the input/output (I/O) operations performed on source database tables during the transform phase to only those columns that are utilized (e.g., read, written) by stages in the transform phase. In embodiments described herein, columns that are not utilized by stages in the transform phase (but are required to be included in a target database) are copied directly from the source database tables into the target database during the load phase. Embodiments are contrasted to contemporary ETL systems that use a row based data transfer where all of the columns in a given row are accessed as a unit in each I/O performed to the source database tables even in the cases where only a subset of the columns are used by any of the stages in the transform phase.

In order to facilitate the transform stages, data extracted from source systems as part of the extract phase in an ETL process are often stored in source database tables made up of rows and columns. The transform phase in an ETL process typically includes multiple transform stages where each stage operates on a single or small subset of the columns in the source database tables. Contemporary ETL systems operate in terms of rows, and thus, the unit of data transfer in a contemporary ETL system is a row. When a row is accessed in a contemporary ETL system all of the columns of the row are read and transferred to a given transform stage even if the transform stage operates only a subset of the columns in the row. The transfer of all of the columns in a row (including columns that are unused by a transform stage) may result in poor performance caused by the unnecessary transfer of data (e.g., additional time, additional I/O resources). This is compared to embodiments of column based data transfer systems described herein that use a column as the basic unit of transfer, and thus only the columns being operated on, or required, by a given stage in a transform phase are transferred to the stage. Column data is moved directly from the source database table(s) to a target stage where it is needed, and a row identifier RID is used to keep track of the output of each stage to allow column data to be merged to form "partial rows" when needed. Advantages of ETL systems that use column based data transfer, when compared to row based data transfer ETL systems, include less time for I/O, faster data processing (e.g., due to transform stages operating on smaller amounts of data), and smaller memory requirements.

An ETL process that uses column based data transfer may be performed in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
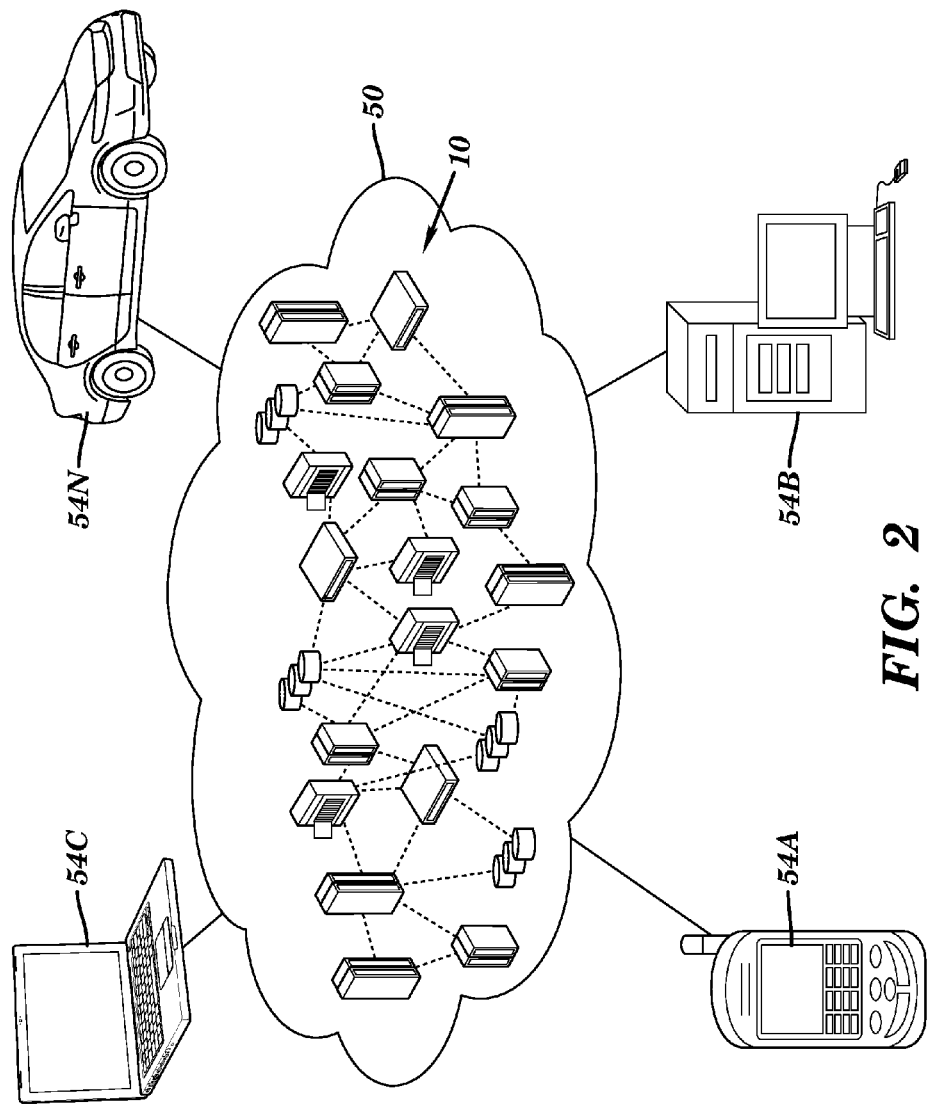
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
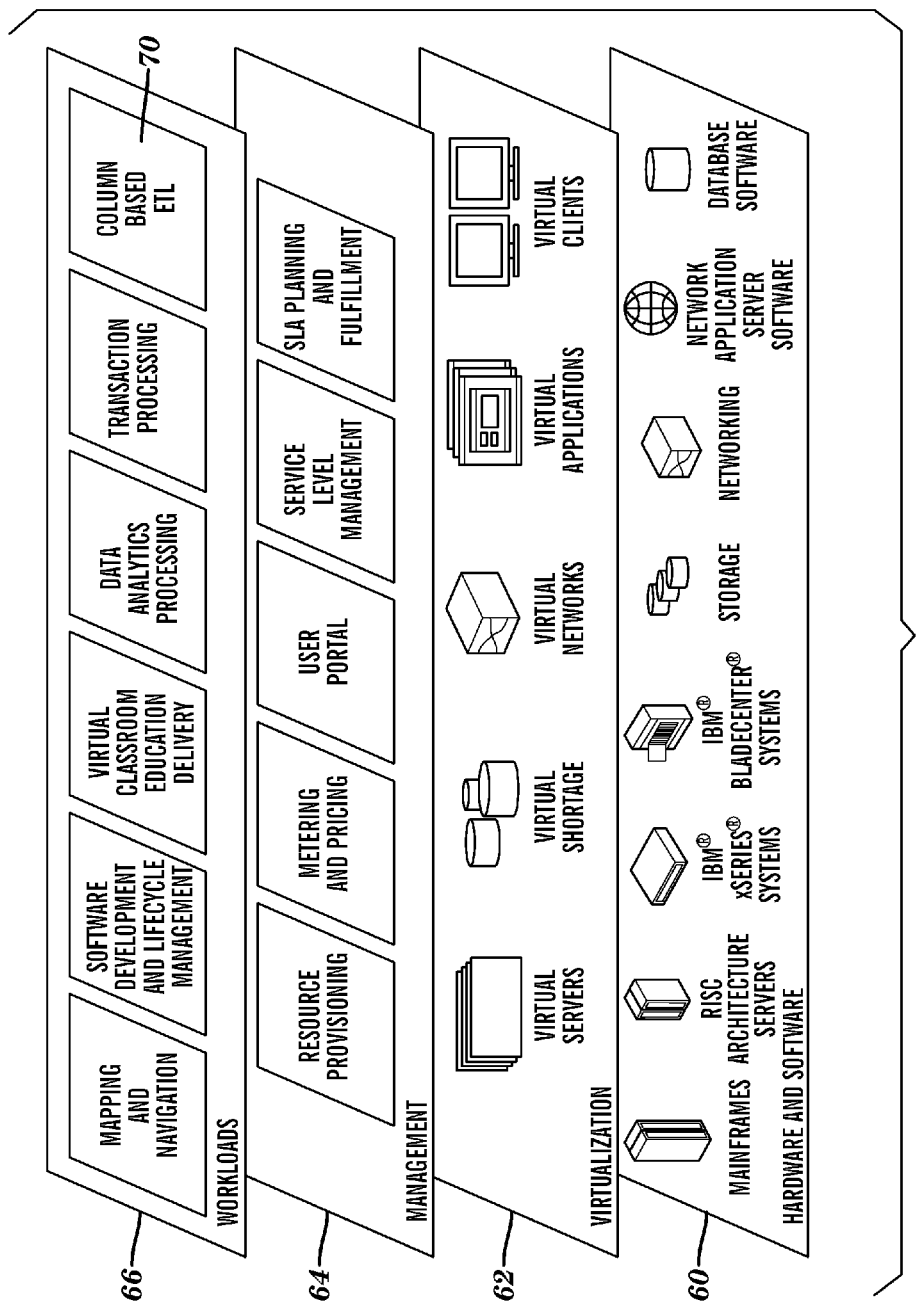
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data integration workflow processing.

In one exemplary embodiment, a column based ETL application 70 located in the workloads layer 66 implements the column based ETL processes described herein; however, it will be understood that the column based ETL application 70 may be implemented in any of the abstraction model layers shown in FIG. 3. The column based ETL application 70 includes one or more algorithms to execute ETL jobs (e.g., made up of extract, transform and load phases) that use column based data transfers.

Figure 4:
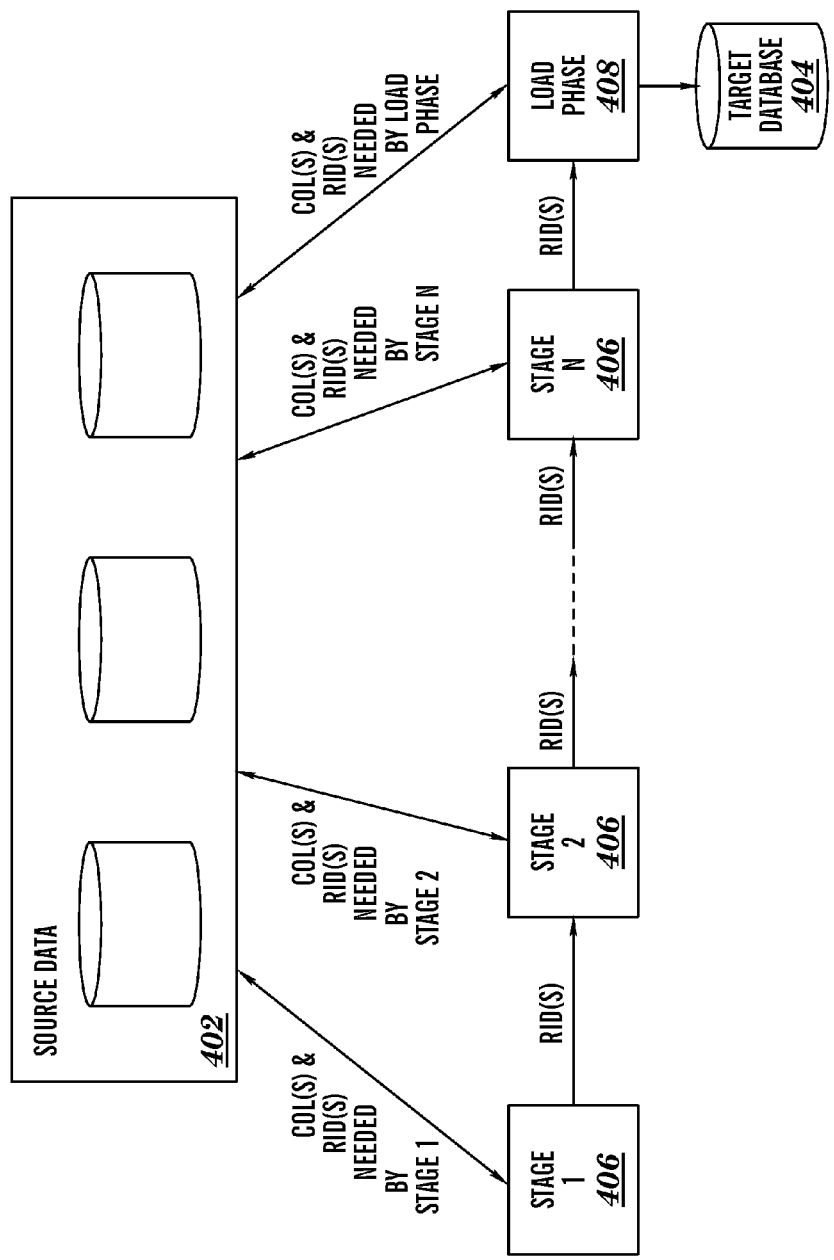
FIG. 4 illustrates a block diagram of a process flow for performing a column based data transfer in an extract, transform and load (ETL) system according to an embodiment of the present invention.

Turning now to FIG. 4, a block diagram of the processing of an ETL job using a column based data transfer ETL process is generally shown. The processing shown in FIG. 4 is implemented by the column based ETL application 70 executing, for example, on computer system 12. As shown in FIG. 4, source data 402 that has been extracted (in one or more stages) from one or more source systems is stored in a database format (e.g., as source database tables having source database table rows and source database table columns). The source database tables in the source data 402 are in a column representation where the column is the basic unit of transfer and a subset of the columns in all or a subset of the rows is read as a unit. If the source database tables in the source data are originally in a row representation (where the row is the basic unit of transfer and all of the columns in a row are read as a unit), then they are converted to the column representation. One method of converting from a row representation into a column representation is to read the source data 402 in row format and to convert the read data into individual columns. Another method of converting is to read the source database table(s) one column at a time (using column binding) and to send the result downstream to be processed by downstream stages. A similar conversion may also be performed at the target database 404 as well.

The ETL process shown in FIG. 4 includes an ETL job having "N" transform stages 406, with the transform stages 406 being executed in sequential order to prepare data for being loaded into the target database 404 during the load phase 408. Though not shown in FIG. 4, two or more transform stages 406 may be performed in parallel with each other. At each transform stage 406, transform logic, as specified by the ETL job being executed by the column based ETL application 70, is executed to generate transformed data. As shown in FIG. 4, the columns required by the transform logic are retrieved directly from the source data 402, and column data is transferred from the source data 402 directly to the transform stage 406 where it is first required. The transform stages 406 shown in FIG. 4 receive, generate, and output row identifiers (RIDs). As used herein, the term "row identifier" or "RID" refers to data that uniquely identifies a row in one or more of the source database tables in the source data 402. The RIDs are used to correlate column data across stages and each RID is a unique index into a source database table.

Also shown in FIG. 4, RIDs received into a stage 406 from an upstream stage 406 are used to retrieve selected column data directly from the source data 402. In addition, partial row data may be generated using the column data that was previously retrieved directly from the source data 402. As used herein, the term "partial row data" refers to a copy of a row of a source database table that includes a subset of the columns contained in the source database table. The partial row data is created in each stage based on the columns required by the stage and the RIDs input to the stage. The partial row data may also include additional columns that that are not included in the source database table (e.g., the additional columns were derived in a transform stage based on the source data). An additional column in the partial row data contains data that is correlated to rows in a source database table using the RIDs. Also shown in FIG. 4 is that columns in a source database table that are not manipulated by any of the transform stages 406 in the ETL job are populated in the target database 404 by the load phase 408 (which may be made up of one or more stages) by retrieving data directly from the source data 402.

Figure 5:
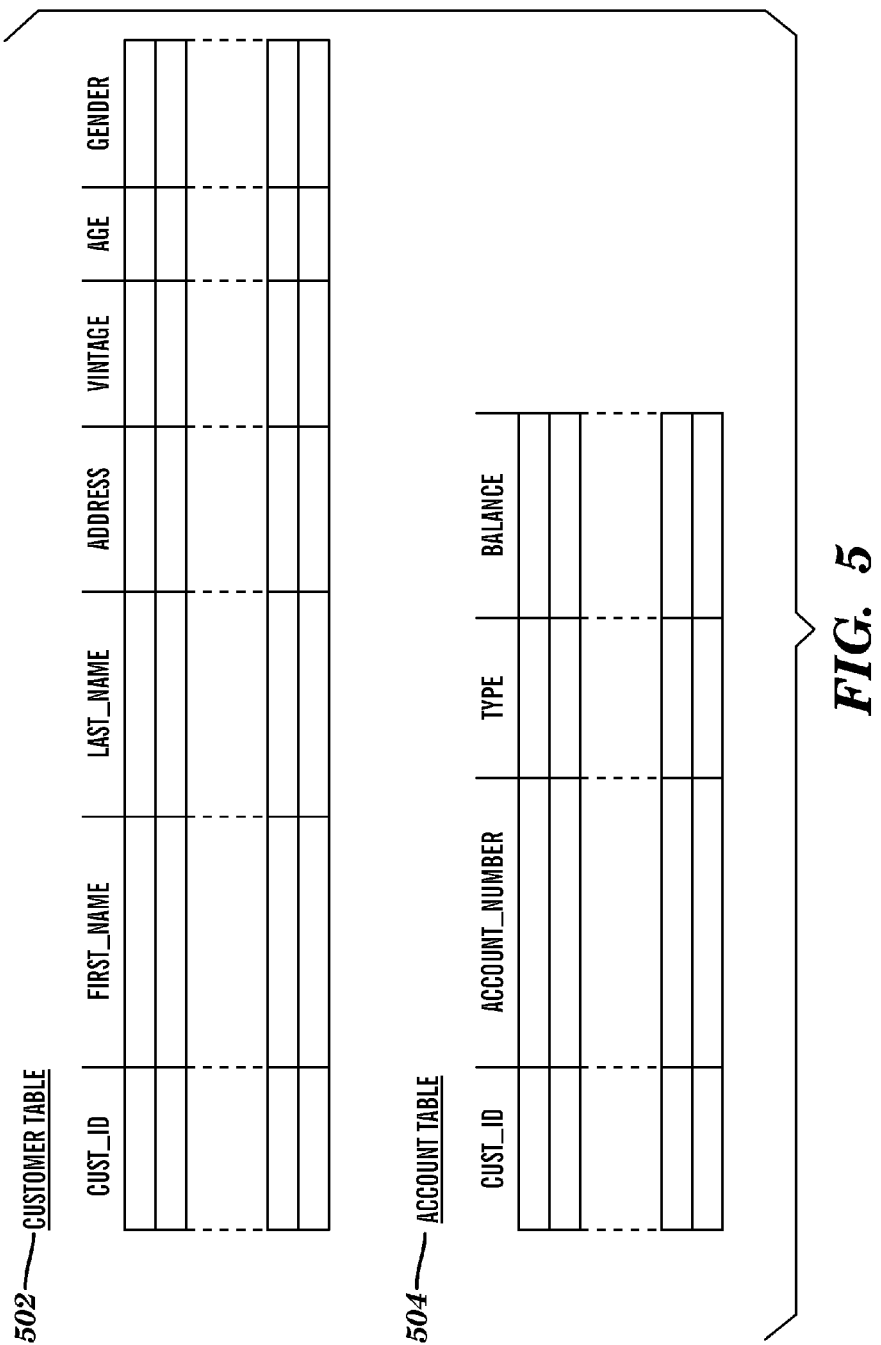
FIG. 5 illustrates a block diagram of a customer table and an account table that may be utilized by an embodiment of the present invention.

Turning now to FIG. 5, a block diagram of extracted source data 402 that includes two source database tables, a customer table 502 and an account table 504, is generally shown. The columns in the customer table 502 include "cust_id", "first_name", "last_name", "address", "vintage", "age", and "gender". The columns in the account table 504 include2 "cust_id", "account_number", "type", and "balance".

An exemplary ETL job that utilizes the customer table 502 and the account table 504 shown in FIG. 5 as source data 402, writes all of the columns in the customer table 502 to a target database 404 during the load phase of the ETL job. However, the first_name, last_name, address, vintage, age, and gender columns in the customer table 502 are not used in any of the transform stages of the ETL job. These columns are only required as output to the target database 404 during the load phase of the ETL job. In a row based data transfer ETL system, all of the columns in the customer table 502 are accessed and moved through each of the stages in the transform phase. In a column based data transfer ETL system, the columns that are not used during the transform phase are not accessed during the transform phase and instead are copied directly from the source data 402 (in this case the customer table 502) to the target database 404 during the load phase. In a column based data transfer, columns which are used by transform stages 406 are moved directly from the source data 402 to the transform stages 406 where they are used. This eliminates the additional I/Os and the additional memory required to move unused columns through the stages as the ETL job is being executed.

Figure 6:
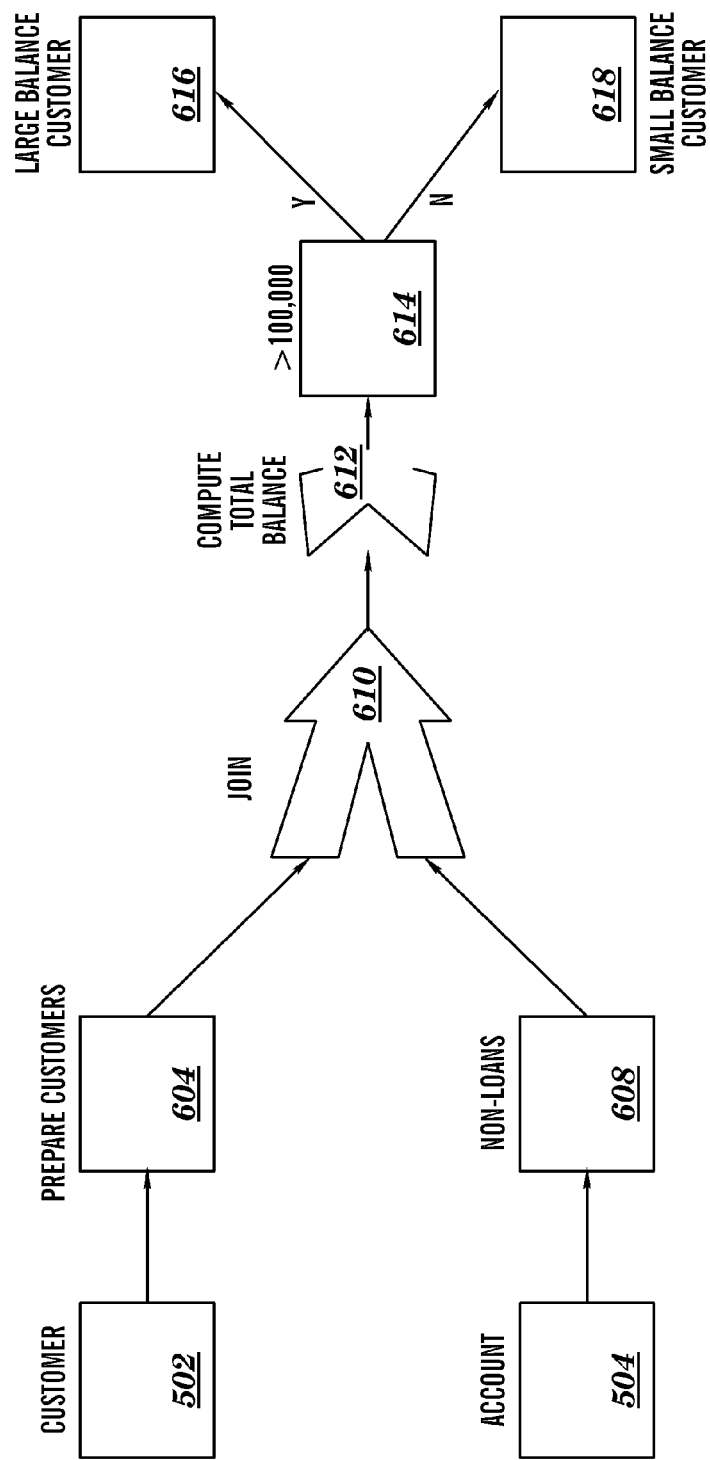
FIG. 6 illustrates a flow diagram of a process for performing column based data transfer in an ETL system according to an embodiment of the present invention.

Referring to FIG. 6, a flow diagram of the processing of an ETL job using a column based data transfer ETL process that uses the customer table 502 and the accounts table 504 described in reference to FIG. 5 is generally shown. The processing shown in FIG. 6 is implemented by the column based ETL application 70 executing, for example, on computer system 12 to identify customers in the customer table 502 having non-loan type accounts with balances over one-hundred thousand dollars. The customer table 502 and the account table 504 have been converted into a column representation (if they were previously in a row representation). A transform stage is executed at block 608 to filter out all accounts in the account table 504 that are not loans. This may be performed by inspecting the type column in the account table 504. Input to block 608 is the data making up the type column (i.e., partial row data) in the account table 504 along with corresponding RIDs, and output from block 608 are the RIDs corresponding to rows in the account table 504 that pass the filter criteria of not being loan type accounts. Also shown in FIG. 6 is a transform stage being executed at block 604 (in parallel to the transform stage being executed at block 608) that receives as input the cust_id column of the customer table 502 (i.e., partial row data) and outputs a RID (in this case the cust_id is the RID) associated with each row in the customer table 502 having a unique customer identifier.

A join is performed at the transform stage executed at block 610 using as input RIDs from blocks 604 and 608. The data in the cust_id column from the customer table 502 is sourced directly from the customer table 502 using the RIDs from block 604 and the cust_id columns from the account table 504 are sourced directly from the account table 504 using the RIDs from block 608. The join at block 610 determines which customers (identified by a cust_id) have non-loan accounts and matches these customers from the customer table 502 with their non-loan type accounts in the account table 504. Output from the join transform stage at block 610 are RID pairs including a RID for the customer table 502 and a RID to the corresponding row in the account table 504. The RID pairs represent rows in the customer table 502 corresponding to customers who have non-loan accounts and their corresponding row(s) in the account table.

An aggregate transform stage is executed at block 612 to compute a total balance in non-loan accounts for each customer in the customer table 502 that has a non-loan account. The aggregate transform stage at block 612 reads the balance column directly from the account table 504 using the row identifiers for the account table 504 that were output from the previous block 610. Partial row data is constructed at block 612 to form group by columns and an aggregate column, with each row containing data from the cust_id column and the balance column. A RID corresponding to a row in the customer table 502 and an array of RIDs corresponding to the rows aggregated in the account table 504 used to compute the total balance for each customer, are output from block 612. In addition, a new column containing the total balance of each customer is also output along with the RIDs. These outputs are input to block 614, where it is determined whether the total balance for each customer is over $100,000. If the total balance is over $100,000, then the RIDs corresponding to the customer are passed to a stage in a load phase at block 616. Block 616 uses the RIDs associated with the customer table 502 to copy any other columns of data from the customer table 502 into a target database (e.g., a large balance customer database). Similarly, block 618 uses the RIDs associated with rows in the customer table 502 to add any other columns of data from the customer table 502 into a target database (e.g., a small balance customer database).

It will be appreciated that embodiments of the column based data transfer ETL system described herein may be utilized to perform any ETL job and that embodiments are not limited by the embodiment of the ETL job described above in reference to FIGS. 5 and 6.

As shown in the example of FIGS. 5 and 6, the column based data transfer ETL system includes RIDs being transferred from stage to stage, and data at each stage is read from the source data. In other examples, partial rows made up of partial row data are formed once a column in a table in the source data has been accessed by a transform stage, and the partial rows are passed to downstream stages.

An embodiment also includes a hybrid ETL system that supports both row and column based representation as a processing unit depending on which is most beneficial for a given ETL job. In some cases, a row based data transfer ETL system might be more beneficial, for example for ETL jobs that include read, aggregate, and write, where the aggregate uses all but one column for the group by and one column for the aggregate. In such a case, essentially all of the columns would have to be read by the intermediate transform stages in the ETL job and thus, the entire table will be transferred from stage to stage. In this case, it does not make sense to incur the overhead of splitting the source data into columns and correlating them back at a later stage in the transform phase or at a target stage in the load phase using RIDs.

In a hybrid ETL system, an optimizer analyzes the ETL job to predict whether column or row based representation is best (e.g., in terms of I/Os and memory usage) for a given ETL job. The optimizer compares the I/O overhead of the column based representation with the I/O overhead of the row based representation. The representation that has the lowest predicted I/O overhead is selected. The optimizer functions may be included in the column based ETL application 70.

Technical effects and benefits include a reduction in the number of I/Os and a reduction in storage required while executing an ETL job.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
executing a plurality of transform stages in an extract, transform and load (ETL) job, the ETL job including an extract stage and a load stage in addition to the plurality of transform stages, and the ETL job configured to access a source database table that includes data organized into source database table rows and source database table columns, the executing comprising for each transform stage:
  receiving, from an upstream stage, a plurality of input row identifiers (RIDs) corresponding to a first plurality of source database table rows in the source database table;
  retrieving data directly from a subset of the source database table columns in the first plurality of source database table rows in the source database table, the retrieving responsive to the input RIDs and to transform logic associated with the transform stage, wherein the subset of the source database table columns consists of one or more of the source database table columns that are required by one of the plurality of transform stages;
  generating partial row data for each of the first plurality of source database table rows, the partial row data comprising data from the subset of the source database table columns;
  generating transformed data responsive to the partial row data and to the transform logic; and
  outputting, to a downstream stage, a plurality of output RIDs corresponding to a second plurality of source database table rows that include at least a subset of the transformed data.

2. The method of claim 1, further comprising converting the source database table from a row representation configured to read all of the source database table columns in a source database table row as a unit into a column representation configured to read at least a subset of the source database table rows in a source database table column as a unit.

3. The method of claim 1, wherein the transformed data includes a new column of data not included in the source database table, and the executing for each transform stage further comprises outputting the new column of data to the downstream stage.

4. The method of claim 3, wherein the executing for each transform stage further comprises receiving the new column of data, and the partial row data further comprises data from the new column of data.

5. The method of claim 1, wherein the executing for each transform stage further comprises outputting at least a subset of the transformed data to the downstream stage.

6. The method of claim 1, wherein the method further comprises executing the load stage, the executing comprising copying at least a subset of the data in the source database table directly from the source database table into a target database.

7. The method of claim 1, wherein the input RIDs and the output RIDs correlate source database table column data across the stages in the ETL job.

8. The method of claim 1, wherein software is provided as a service in a cloud environment to perform the executing a plurality of transform stages in an ETL job.

9. A system, comprising:
  a computer processor; and
  logic executable by the computer processor, the logic configured to implement a method, the method comprising:
    executing a plurality of transform stages in an extract, transform and load (ETL) job, the ETL job including an extract stage and a load stage in addition to the plurality of transform stages, and the ETL job configured to access a source database table that includes data organized into source database table rows and source database table columns, the executing comprising for each transform stage:
      receiving, from an upstream stage, a plurality of input row identifiers (RIDs) corresponding to a first plurality of source database table rows in the source database table;
      retrieving data directly from a subset of the source database table columns in the first plurality of source database table rows in the source database table, the retrieving responsive to the input RIDs and to transform logic associated with the transform stage, wherein the subset of the source database table columns consists of one or more of the source database table columns that are required by one of the plurality of transform stages;
      generating partial row data for each of the first plurality of source database table rows, the partial row data comprising data from the subset of the source database table columns;
      generating transformed data responsive to the partial row data and to the transform logic; and
      outputting, to a downstream stage, a plurality of output RIDs corresponding to a second plurality of source database table rows that include at least a subset of the transformed data.

10. The system of claim 9, wherein the method further comprises converting the source database table from a row representation configured to read all of the source database table columns in a source database table row as a unit into a column representation configured to read at least a subset of the source database table rows in a source database table column as a unit.

11. The system of claim 9, wherein the transformed data includes a new column of data not included in the source database table, and the executing for each transform stage further comprises outputting the new column of data to the downstream stage.

12. The system of claim 11, wherein the executing for each transform stage further comprises receiving the new column of data, and the partial row data further comprises data from the new column of data.

13. The system of claim 9, wherein the executing for each transform stage further comprises outputting at least a subset of the transformed data to the downstream stage.

14. The system of claim 9, wherein the method further comprises executing the load stage, the executing comprising copying at least a subset of the data in the source database table directly from the source database table into a target database.

15. The system of claim 9, wherein the input RIDs and the output RIDs correlate source database table column data across the stages in the ETL job.

16. The system of claim 9, wherein the executing a plurality of transform stages in an ETL job is provided as a service in a cloud environment.

17. A computer program product comprising a tangible storage medium readable by a processing circuit and storing instructions for execution by the processing circuit for performing a method comprising:
  executing a plurality of transform stages in an extract, transform and load (ETL) job, the ETL job including an extract stage and a load stage in addition to the plurality of transform stages, and the ETL job configured to access a source database table that includes data organized into source database table rows and source database table columns, the executing comprising for each transform stage:

receiving, from an upstream stage, a plurality of input row identifiers (RIDs) corresponding to a first plurality of source database table rows in the source database table;

retrieving data directly from a subset of the source database table columns in the first plurality of source database table rows in the source database table, the retrieving responsive to the input RIDs and to transform logic associated with the transform stage, wherein the subset of the source database table columns consists of one or more of the source database table columns that are required by one of the plurality of transform stages;

generating partial row data for each of the first plurality of source database table rows, the partial row data comprising data from the subset of the source database table columns;

generating transformed data responsive to the partial row data and to the transform logic; and outputting, to a downstream stage, RIDs corresponding to a second plurality of source database table rows containing at least a subset of the transformed data in the source database table.

18. The computer program product of claim 17, wherein the method further comprises converting the source database table from a row representation configured to read all of the source database table columns in a source database table row as a unit into a column representation configured to read at least a subset of the source database table rows in a source database table column as a unit.

19. The computer program product of claim 17, wherein the transformed data includes a new column of data not included in the source database table, and the executing for each transform stage further comprises outputting the new column of data to the downstream stage.

20. The computer program product of claim 19, wherein the executing for each transform stage further comprises receiving the new column of data, and the partial row data further comprises data from the new column of data.

21. The computer program product of claim 17, wherein the executing for each transform stage further comprises outputting at least a subset of the transformed data to the downstream stage.

22. The computer program product of claim 17, wherein the method further comprises executing the load stage, the executing comprising copying at least a subset of the data in the source database table directly from the source database table into a target database.

23. The computer program product of claim 17, wherein the executing a plurality of transform stages in an ETL job is provided as a service in a cloud environment.

* * * * *